United States Patent
Queisser et al.

(10) Patent No.: US 6,948,167 B1
(45) Date of Patent: Sep. 20, 2005

(54) DATA EXCHANGE METHOD IN A MULTI-PROCESSOR SYSTEM

(75) Inventors: Frank Queisser, Regensburg (DE); Claus Rose, Koefering (DE); Thomas Vogt, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 674 days.

(21) Appl. No.: 10/130,452

(22) PCT Filed: Nov. 10, 2000

(86) PCT No.: PCT/DE00/03939

§ 371 (c)(1),
(2), (4) Date: May 16, 2002

(87) PCT Pub. No.: WO01/37100

PCT Pub. Date: May 25, 2001

(30) Foreign Application Priority Data

Nov. 16, 1999 (DE) ................................ 199 55 092

(51) Int. Cl.[7] ............................................. G06F 9/445
(52) U.S. Cl. ...................... 717/177; 717/175; 717/149; 717/178; 709/201; 709/205; 719/313; 719/318
(58) Field of Search ................................ 717/103, 173, 717/175, 176, 177, 178; 713/172, 149; 709/204, 709/220, 205, 201, 231; 719/313, 318, 319; 710/46, 44, 48

(56) References Cited

U.S. PATENT DOCUMENTS

| | | | | |
|---|---|---|---|---|
| 5,794,040 A | * | 8/1998 | Ono et al. ................... | 717/100 |
| 5,835,911 A | * | 11/1998 | Nakagawa et al. ......... | 707/203 |
| 6,151,620 A | * | 11/2000 | Madsen et al. ............. | 709/204 |
| 6,681,390 B2 | * | 1/2004 | Fiske .......................... | 717/173 |
| 6,715,145 B1 | * | 3/2004 | Bowman-Amuah ......... | 718/101 |
| 6,748,460 B2 | * | 6/2004 | Brice et al. .................... | 710/5 |
| 6,754,738 B2 | * | 6/2004 | Brice et al. .................. | 710/48 |
| 6,854,009 B1 | * | 2/2005 | Hughes ...................... | 709/220 |

OTHER PUBLICATIONS

TITLE: A Cache-based Message Passing Scheme for a Shared-bus Multiprocessor, author: Preiss et al, IEEE, 1988.*
TITLE: Compiling for Shared-Memory and Message-Passing Computers, author: Larus, ACM, 1993.*

* cited by examiner

*Primary Examiner*—Chameli C. Das
(74) *Attorney, Agent, or Firm*—Baker Botts LLP

(57) ABSTRACT

In the data exchange method in a multiprocessor system which has a primary processor and at least one secondary processor which communicate with one another via a system bus, with data being able to be exchanged with an application system via an interface to the primary processor, recurrent standard messages contain application data, so that, first, it is possible for application data to be prescribed during the application of the multiprocessor system, and, second, an application data item used as a polling system can be used to display values of memory cells in the secondary processors on the application system without the user on the application system needing to have any knowledge of the internal structure of the multiprocessor system.

6 Claims, 3 Drawing Sheets

DATA EXCHANGE METHOD IN A MULTI-PROCESSOR SYSTEM

CROSS-REFERENCE TO RELATED APPLICATIONS

This is a national application for International Application No. PCT/DE00/03939 which was filed on Nov. 10, 2000 and which published in German on May 25, 2001, which in turn claims priority from 199 55 092.1, which was filed on Nov. 16, 1999, of which the following is a SUBSTITUTE SPECIFICATION

FIELD OF THE INVENTION

The invention relates to a data exchange method in a multiprocessor system which has a primary processor and at least one secondary processor which communicate with one another via a system bus, the multiprocessor system being able to exchange data with an external system via an interface to the primary processor. The secondary processor performs control tasks on an installation.

BACKGROUND OF THE INVENTION

Such a multiprocessor system is frequently used in motor vehicles to perform various regulation and control tasks with a controller in the form of a multiprocessor system. The multiprocessor system has prescribed application data, which are accessed during operation, and operating data, which are processed internally in the system and change according to the operating state of the installation being controlled, for example the vehicle.

The design of such a multiprocessor system requires that the data record with application data be chosen in a suitable manner. This is referred to as "application". In this case, the application data, which are later constant, are altered in the multiprocessor system's memory and the reactions are observed in order to be able to perform optimization. An example of an application data item for a multiprocessor system controlling an internal combustion engine is the ignition angle which needs to be chosen for a particular load point.

During application, multiprocessor systems now have the drawback that user needs to manage the individual processors. This assumes knowledge about the internal splitting of the algorithms and data in the multiprocessor system.

EP 0 562 333 A2 discloses a communication network in which a central control node and distributed control nodes communicate with one another. The network has a serial bus and addresses the distributed control nodes cyclically after a predetermined number of clock pulses. To stipulate the order, each control node is assigned an ordinal number.

Accordingly, it would be desirable to be able to consider a multiprocessor system as a unit when prescribing application data during application, and not to have to manage the individual processors in the system separately.

SUMMARY OF THE INVENTION

It is therefore an object of the present invention to specify a data exchange method for a multiprocessor system in which the user does not need to have any knowledge of the internal structure of the multiprocessor system when it addresses it for data exchange with an external system, for example during application. To this end, the invention provides, internally in the system, a standard message for communication which can be downwardly directed, i.e. from the primary processor to the secondary processor, or upwardly directed, i.e. from the secondary processor to the primary processor. Each standard message is sent via the system bus and comprises a plurality of data blocks. Downward standard messages comprise at least an address block identifying the addressed secondary processor, a counter block identifying the number of an application data block coming later, at least one operating data block containing operating data relevant to the current operation of the secondary processor, and at least one application data block. This application data block can contain other application data for each downward transmission during application of the system, i.e. while the user prescribes the application data which are later constant during configuration on an external application system. Alternatively, the application data block can also be used to transmit a polling command which instructs the multiprocessor system to transmit the current value of a particular operating data item. The multiprocessor system then inserts the polling command in the next downward standard message to the addressed secondary processor, which then transmits the current value to the primary processor, from where it is sent to the application system. For such transmission from the secondary processor to the primary processor, upward standard messages are used which can be sent in a return communication relating to the downward standard messages and are likewise constructed from a plurality of data blocks. An upward standard message comprises at least an operating data block and an indicator data block which contains the data item polled using the polling command.

This combination of downward and upward standard messages which takes place in the multiprocessor system, and of which the user need not have any knowledge, allows the user to monitor the reaction when prescribing application data by virtue of his sending suitable polling commands to the primary processor and displaying data which he requires.

As a result of this method the user does not need to concern himself with the internal algorithmic splitting in the multiprocessor system, but rather merely communicates with the primary processor and receives the desired data back from the latter. He can therefore treat the multiprocessor system as one unit.

In a preferred embodiment, the secondary processors have no nonvolatile memory, in which case, when the multiprocessor system is started, the necessary set of application data needs to be transmitted from the primary processor to the secondary processors. This is done by means of "initialization messages" which, in the same way as standard messages, are made up of data blocks which comprise, among other things, an identification block identifying the message as an initialization message and at least one application data block containing, at least in part, the prescribed application data required for further operation. If the number of application data items is so large that it cannot be transmitted with an initialization message, it is also possible to provide a plurality of initialization messages over which the application data required are distributed. In the case of this preferred embodiment, the standard messages are also preceded by an identification block which identifies them as standard messages. It is further preferred, if a check block, which checks for correct transmission, is appended to the end of each message.

The present invention can be used particularly advantageously for controlling an electromechanically operated valve pinion using a multiprocessor system. This is an example of a multiprocessor system used in a vehicle when small volumes of data are to be transmitted. This multiprocessor system has an internal bus link, for example through an SPI bus, between the primary processor, which is a communication computer, and the secondary processors, which, for example, address the individual electromechanically operated gas exchange valves from positioning controllers. The communication computer is addressed externally, normally via a CAN bus. This bus is used to connect the application system and the communication computer during application. An advantage of the present inventive method is inter alia, that not every positioning computer needs to be connected to the CAN bus, and that application can be effected by simply addressing the communication computer via the CAN bus. Accordingly, the present invention extends the functionality of the communication, provided as standard, between the computers in the multiprocessor system such that simplified application is possible. The counter block provided in each message allows application data records which are larger than the length of a message to be transmitted and managed. In this context, the development using initialization messages speeds up starting of the multiprocessor system by fast and compact transmission of the necessary application data.

BRIEF DESCRIPTION OF THE DRAWINGS

The present invention is explained in more detail hereinbelow in conjunction with the drawings, in which.

DETAILED DESCRIPTION OF THE INVENTION

Figure 1:
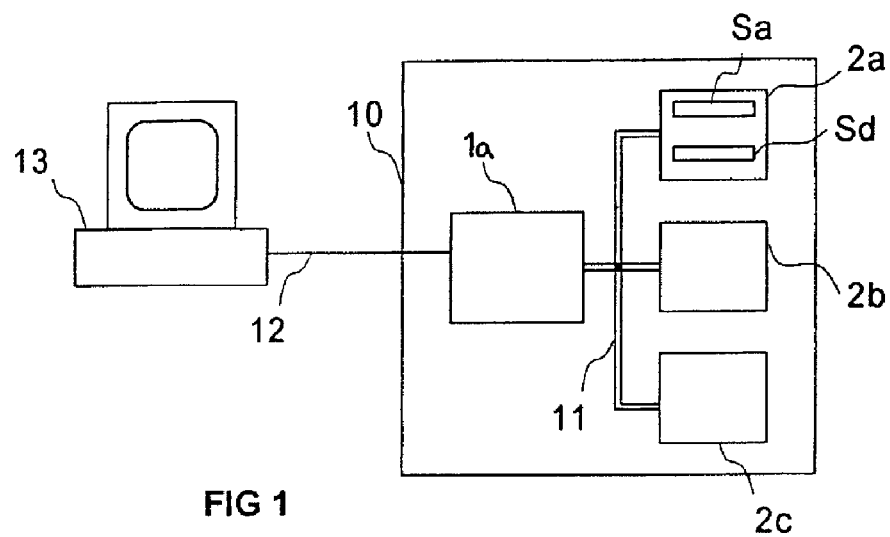
FIG. 1 shows a block diagram of a multiprocessor system with access to an application system.

FIG. 1 shows a schematic illustration of a multiprocessor system. It comprises a primary processor 1a and a plurality of secondary processors. In this example, there are three secondary processors 2a, 2b and 2c. Primary processor 1a and secondary processors 2a, 2b and 2c are connected to one another via a system-internal bus 11. The entire multiprocessor system 10 can be connected to an application system 13 via an external connection 12.

The primary processor 1a communicates with the secondary processors 2a, 2b, 2c via the system-internal bus 11. By way of example, the secondary processors 2a, 2b, 2c perform a control task on an installation. For this control task, they require application data. These are firmly prescribed data which, by way of example, portray the reaction of the secondary processor to a particular operating state. In addition, each secondary processor 2a, 2b, 2c processes "operating data", which can change during operation of the multiprocessor system 10. Such an operating data item can be a measured variable in a controlled installation. Each secondary processor 2a, 2b, 2c has memory cells Sa and Sd storing the application data and the operating data. For the sake of simplification, FIG. 1 shows only a memory cell Sa and a memory cell Sd, and only for the secondary processor 2a. In reality, there would naturally be a multiplicity of memory cells in each secondary processor.

During the application of the multiprocessor system, an application data record needs to be prescribed from the application system 13 via the external connection 12, and the reaction when this application data record is chosen needs to be observed in order to optimize the application data record. The user makes suitable inputs on the application system 13 and observes corresponding indicators portraying the response of the multiprocessor system, or of the controlled installation, particularly of the current operating data. In this case, the user does not know in which of the secondary processors 2a, 2b or 2c the operating data are being processed. Only the primary processor 1a has this knowledge.

Figure 7:
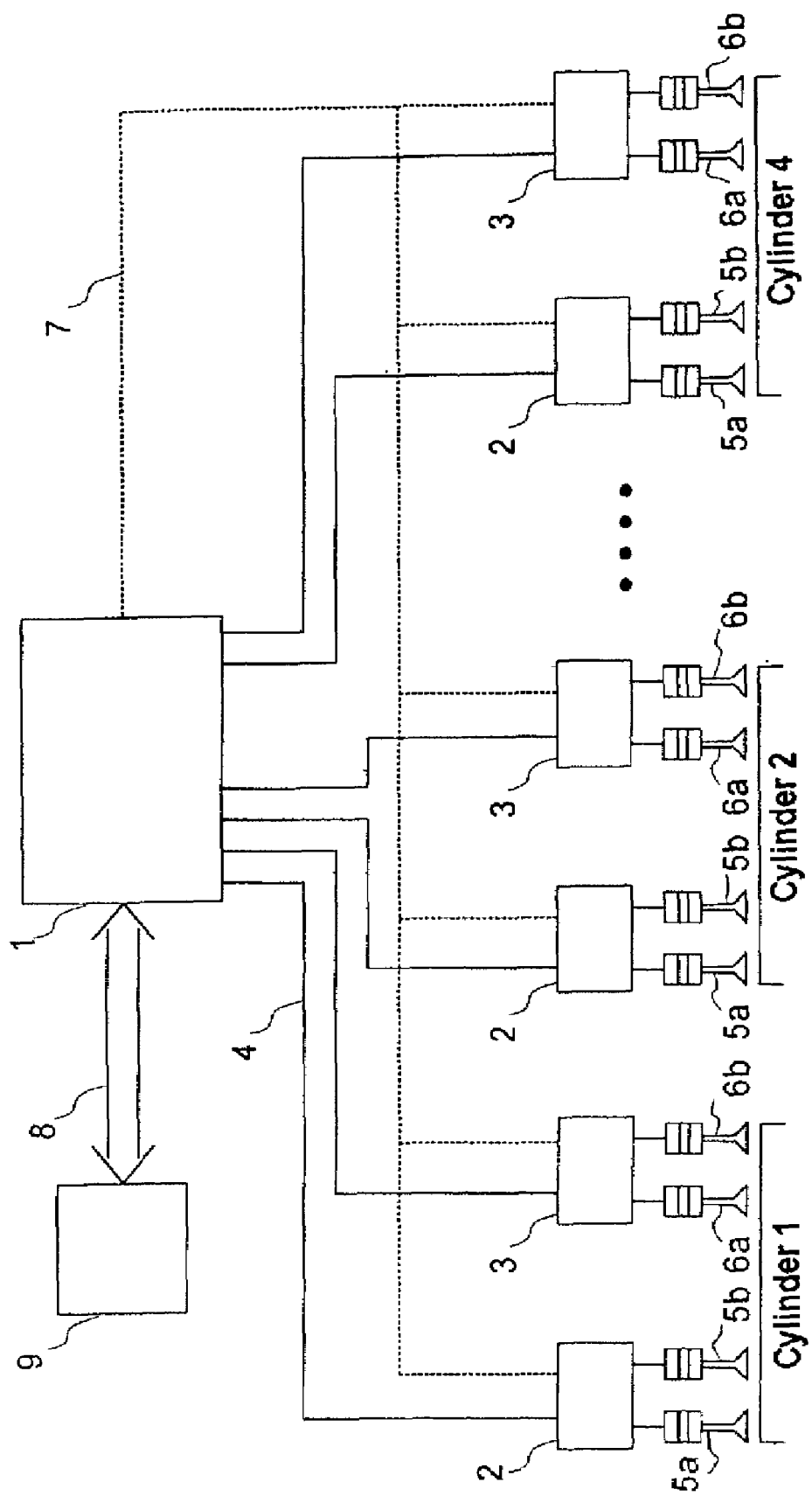
FIG. 7 shows a schematic illustration of the actuation circuit for electromechanically operated gas exchange valves in a four-cylinder internal combustion engine.

An example of such a multiprocessor system 10, which will be described in more detail below is found in the control of electromagnetic gas exchange valves in an internal combustion engine. Such a multiprocessor system is shown in FIG. 7. The circuit in FIG. 7 is used for actuating electromechanically driven gas exchange valves 5a, 5b, 6a, and 6b. Such an electromechanically driven gas exchange valve is described in German utility model no. 297 12 502 U1. For an understanding of this invention, the only fundamental matter in the context of the present invention is that the electro-mechanically operated gas exchange valve is operated by the flow of current through two coils, one coil being responsible for closing and the other for opening the gas exchange valve.

FIG. 7 is a schematic illustration of the circuit for a four-cylinder internal combustion engine, but this number of cylinders is to be understood only to be by way of an example. Here, a cylinder has two inlet valves 5a, 5b and two outlet valves 6a, 6b. For each of the inlet and outlet valves 5a, 5b and 6a, 6b, a dedicated positioning controller 2 and 3 is provided. These positioning controllers are secondary processors in the multiprocessor system which is described below in more detail. The positioning controller 2, 3 actuates output stages which cause the flow of current through the respective coils of the gas exchange valve 5a, 5b, 6a, 6b. In this case, a dedicated output stage is provided for each coil, for example. The positioning controller 2, 3 actuates the output stages of a valve 5, 6 on the basis of a time control signal which indicates when the valve needs to open or close. There is a dedicated time control signal for the inlet and outlet valves of each cylinder. The time control signal is supplied to the positioning controller 2, 3 by a communication computer 1 via a unidirectional communication line 4. This communication computer is the primary processor 1a in the multiprocessor system 10. The positioning controller 2, 3 has a digital processor which regulates the flow of current through the coils using the output stages such that the valve 5a, 5b, 6a, 6b is positioned gently in the desired final position. The positioning controller 2, 3 is connected to the communication computer 1 via a serial SPI bus interface and reports the state of the valves 5a, 5b, 6a, 6b and any valve failure via this interface.

The communication computer 1 is connected to a CAN bus 8 which is used to communicate with the internal combustion engine's operating controller 9. Such a BUS link is described, by way of example, in W. Lawrenz, CAN-Controller Area Network, Hüthig Verlag, 1994, ISBN 3-7785-2263-7. The CAN bus 8 is an illustrative implementation of the external connection 12 between an application system 13 and the multiprocessor system 10. In this exemplary embodiment, the communication computer 1 is the primary processor 1a, and the individual positioning controllers 2, 3 are the secondary processors.

Figure 3:
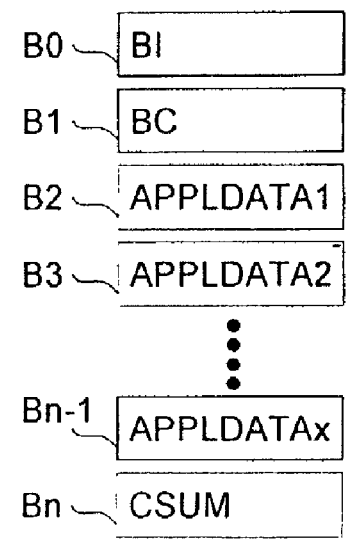
FIG. 3 shows a schematic illustration of an initialization message.

The system-internal bus 11 in this multiprocessor system 10 is in the form of an SPI bus 7 which operates as follows: when the multiprocessor system 10 is started, the communication computer 1 automatically sends initialization messages to all the positioning controllers. Such an initialization message is shown schematically in FIG. 3. It comprises various blocks B0 to Bn. The block size is 8 bits, but any other block size is also conceivable. However, the block size should be at least the size of the data type used so that an individual data item does not need to be split over two blocks. The first block B0 of the initialization message is an identification block BI identifying the initialization message as such. The second block B1 is a count block which instructs where the subsequent application data need to be stored in the corresponding memory cells Sa of the secondary processor in question. Next come a plurality of blocks B2 to Bn-1 with application data APPLDATA1 to APPLDATAx. These are stored in the secondary processor starting at the memory cell Sa, which have been denoted by the count block BC. The initialization message is terminated by a block Bn, which is a check block CSUM which can be used to check, for example by means of a checksum, whether the initialization message has been received correctly.

Since the number of application data items to be transmitted is greater than the number of blocks B2 to Bn-1 available for this purpose, a plurality of initialization messages are sent. The count block BC in successive initialization messages therefore points, for an individual secondary processor, to the respective memory cell Sa at which the subsequently transmitted application data APPLDATA1 to APPLDATAx need to be stored in sequence. The identification block BI additionally addresses the secondary processor or positioning controller in question as well.

The secondary processors 2a, 2b, 2c, i.e. the positioning controllers 2 and 3, remain in the initialization state until they have all received their application data record fully and correctly. Each positioning controller 2, 3 checks whether it has received all the application data required. If an application data item is missing, the respective positioning controller waits until it receives a transmission containing this required application data item. Only after this time is it ready for operation.

If a positioning controller recognizes from the check block that a block or a message has arrived incorrectly, the communication computer 1 or the primary processor 1a is notified, that the data have arrived incorrectly, and that a repeat transmission is required. The communication computer 1 then repeats this initialization message for this secondary processor in order to ensure correct transmission.

Figure 2:
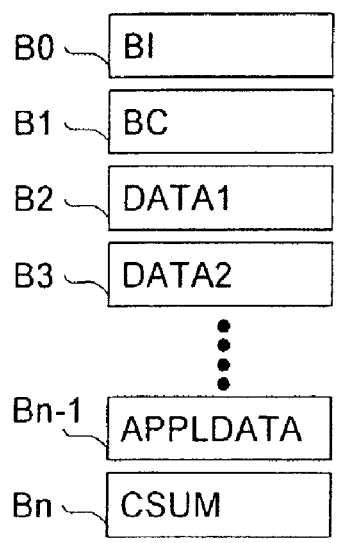
FIG. 2 shows a schematic illustration of a downward standard message.

If all the secondary processors have been provided with their application data, the multiprocessor system changes over to the exchange of standard messages. There are two different standard messages: downward standard messages, directed from the communication computer 1 to the positioning controller 2, 3, and upward standard messages in the opposite direction. Such a downward standard message is shown schematically in FIG. 2. It comprises a plurality of blocks B0 to Bn whose data format preferably corresponds to that of the blocks in the initialization message. The first block B0 is again an identification block which first identifies the message as a standard message, and second addresses the positioning controller in question. The next block B1 is again a count block BC which tells the addressed positioning controller which memory cell Sa is to be assigned an application data item transmitted subsequently in the downward standard message. This count block BC is followed by a plurality of operating data blocks B2 to Bn-2 which contain operating data DATA1, DATA2, etc. These operating data are operation-dependent parameters which the communication computer communicates to the positioning controllers, for example the requested load for the internal combustion engine or prescribed valve switching times. These blocks are followed by a block Bn-1 which contains an application data item APPLDATA. The memory cell Sa in the positioning controller which is to be assigned this application data item can be taken from the count block BC in the downward standard message. The downward standard message is terminated with a check block CSUM in the last block Bn.

This downward standard message allows application data to be communicated to the positioning controller in question. This may be necessary in two cases: first, the communication computer 1 notifies the positioning controller 2, 3 in question of application data which are still missing if said positioning controller signaled, despite repeated initialization messages relating to an upward standard message that it did not receive all the application data. Second, the user can prescribe new application data for the communication computer 1 during application. The communication computer 1 then ascertains the positioning controllers in question and notifies them of the relevant new application data in a plurality of downward standard messages. Finally, instead of the application data item APPLDATA in block Bn-1 of a downward standard message, it is also possible to send a read command.

Figure 4:
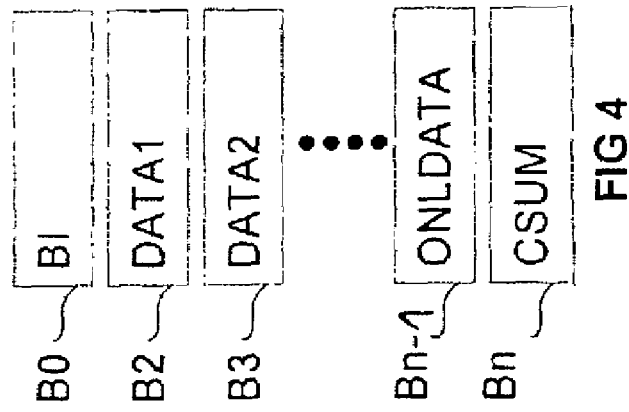
FIG. 4 shows a schematic illustration of an upward standard message.

Each downward standard message via the SPI bus 7 receives a response from the positioning controller 2, 3 in question with an upward standard message, which is shown schematically in FIG. 4.

The upward standard message again starts with a first block B0, which is in the identification block BI. This block identifies the message as an upward standard message and contains, by way of example, a status message for the respective secondary processor. This is followed by a series of blocks B2, B3, . . . containing operating data DATA1, DATA2 for the positioning controller. It is noted that the count block BC present in the other messages described does not appear in the upward standard messages. The operating data are followed by a block Bn-1 which indicates the current value ONLDATA of an operating data item. A check block CSUM terminates the upward standard message in the block Bn. The block Bn-1 with the current value ONLDATA is used for applying the multiprocessor system in the manner below.

Figure 5:
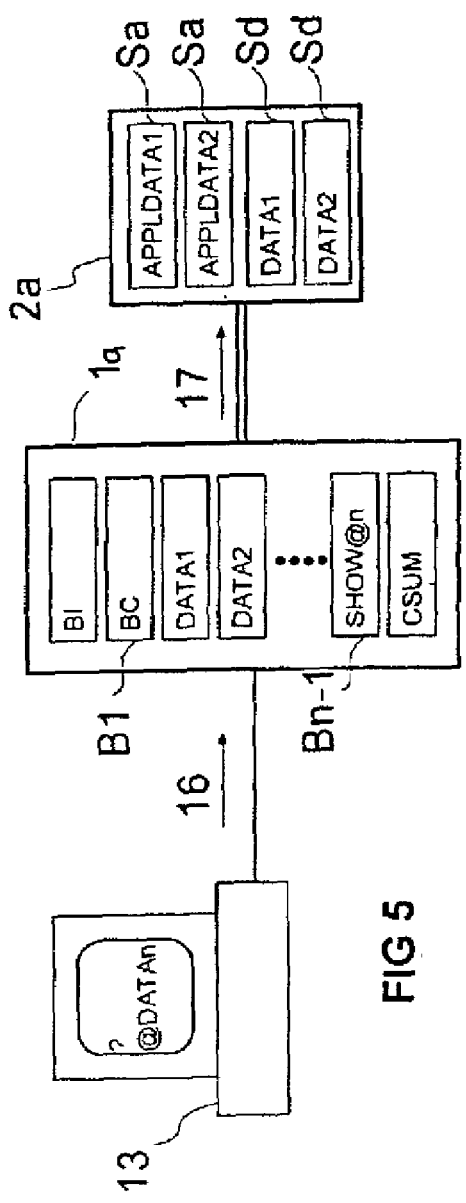
FIGS. 5 and 6 show block diagrams of the multiprocessor system during application using an application system.
Figure 6:
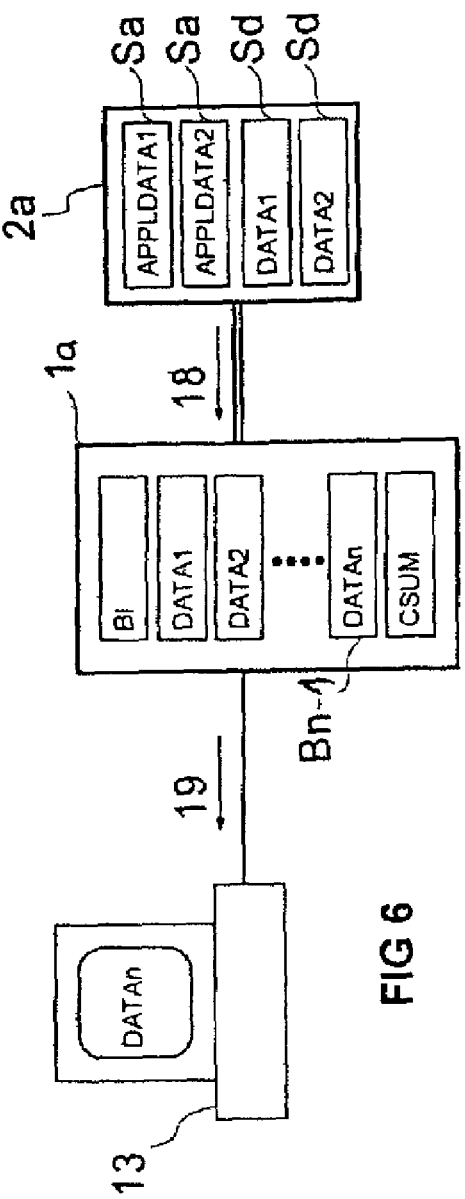

For the purposes of application, the multiprocessor system 10 is connected to an application system 13 via an external connection 12, in this case the CAN-8. The user can use the application system 13, as mentioned, to input and read data. In this case, the user procedure is that he prescribes a particular set of application data and then monitors the response of the multiprocessor system 10, or of an internal combustion engine controlled thereby. To this end, he needs to have some operating data displayed. To achieve this, a polling command for a data item DATAn is set in accordance with the drawing shown in FIG. 5. This polling command is transmitted in the direction of the arrow 16 to the communication computer 1 via the CAN bus 8. The communication computer 1 then establishes, as primary processor 1a, which of the positioning controllers or secondary processors contains this data item, or which memory cell Sd contains it there. In this example, it is the secondary processor denoted by 2a. The communication computer 1 then inserts a polling command SHOW@n into the next downward standard message for the secondary processor 2a in question in the block Bn-1. This message is transmitted in the direction of the arrow 17 to the secondary processor 2a via the SPI bus 7. In the subsequent response, which is shown schematically in FIG. 6, the secondary processor 2a transmits the content of the polled memory cell as the current value ONLDATA in the direction of the arrow 18 via the SPI bus 7 in the upward standard message which is then sent. In this case, the content DATAn is involved. As the primary processor 1a, the communication computer 1 takes this content from the block Bn-1 when this upward standard message has been received and sends it via the CAN bus 8 in the direction of the arrow 19 to the application system 13, where it is displayed.

This example reveals that the user on the application system 13 does not need to have any knowledge of the internal task distribution in the multiprocessor system 10. He merely needs to exchange data with the communication computer 1, i.e. the primary processor 1a, as appropriate and can regard the multiprocessor system 10 as one unit.

We claim:

1. A data exchange method in a multiprocessor system having a primary processor, at least one secondary processor which performs a control task on an installation, wherein the primary processor and the secondary processor communicate with one another via a system bus, and further wherein the primary processor has an interface for data exchange with an external system, said method comprising (a) sending recurrent downward standard messages from the primary processor to the secondary processor via the system bus; (b) responding by means of the second processor to each downward standard message with an upward standard message from the secondary processor to the primary processor, wherein the downward standard messages have a plurality of data blocks with at least an address block which identifies the addressed secondary processor, a counter block which denotes the number of an application data block following in the downward standard message, at least one operating data block which contains operating data prescribed for the current operation of the secondary processor, and at least one application data block which contains application data relevant to the second processor's entire operation, with a polling command for a data item currently available in the secondary processor also being able to be given as application data item, and wherein the upward standard messages to have a plurality of data blocks with at least one operating data block which contains operating data used in the second processor's current operation, and an indicator data block which contains a last data item polled using a polling command; and (c) transmitting by means of the secondary processor a data item last polled using a downward standard message in the indicator data block of its upward standard message until a new data item is polled.

2. The method according to claim 1, further comprising sending at least one initialization message by the primary processor to each secondary processor before step (a) upon startup, said message comprising a plurality of data blocks with at least one application data block which contains application data relevant to the secondary processors' subsequent operation, and in that each message is preceded by an identification block which identifies it as an initialization or standard message.

3. The method according to claim 1, wherein the multiprocessor system controls an internal combustion engine, further comprising first, prescribing a first application data record, a date which is altered by means of downward standard messages during control, and second using suitable polling commands in downward standard messages to poll current data and to display them in order to optimize the application data record.

4. The method according to claim 1, wherein the polling command indicates a memory address in the secondary processor, which memory address holds the polled data item.

5. The method according to claim 2, further comprising determining during startup, whether the secondary processor has received all the application data with the at least one initialization message, and only then responding with an upward standard message.

6. The method according to claim 1, further comprising following each message by a check block to check the message for transmission errors, and whereby the secondary processor, upon receiving an incorrect message, discards said message and continues to work with the application data available to date until it receives another valid message with new application data.

* * * * *